No. 783,960. PATENTED FEB. 28, 1905.
C. D. JENKINS.
MACHINE FOR FORMING BRIQUETS.
APPLICATION FILED FEB. 10, 1903. RENEWED JUNE 1, 1904.

2 SHEETS—SHEET 1.

Witnesses:
Nathan C. Lombard 2nd
Edwin T. Luce

Inventor:
Charles D. Jenkins,
by Walter E. Lombard.
Atty.

No. 783,960. PATENTED FEB. 28, 1905.
C. D. JENKINS.
MACHINE FOR FORMING BRIQUETS.
APPLICATION FILED FEB. 10, 1903. RENEWED JUNE 1, 1904.

2 SHEETS—SHEET 2.

Witnesses:
Nathan C. Lombard 2nd
Edwin T. Luce

Inventor:
Charles D. Jenkins,
by Walter E. Lombard
Atty.

No. 783,960. Patented February 28, 1905.

UNITED STATES PATENT OFFICE.

CHARLES DUNSFORD JENKINS, OF BOSTON, MASSACHUSETTS.

MACHINE FOR FORMING BRIQUETS.

SPECIFICATION forming part of Letters Patent No. 783,960, dated February 28, 1905.

Application filed February 10, 1903. Renewed June 1, 1904. Serial No. 210,680.

*To all whom it may concern:*

Be it known that I, CHARLES DUNSFORD JENKINS, a citizen of the United States of America, and a resident of Boston, in the county of Suffolk and State of Massachusetts, have invented certain new and useful Improvements in Machines for Forming Briquets, of which the following is a specification.

This invention relates to machines for forming briquets from peat or similar material, and has for its object the production of a machine into which peat, soft coal, or a similar material may be fed, subjected to a great pressure, and delivered therefrom in briquets of uniform shape.

It consists in certain novel features of construction and arrangement of parts, which will be readily understood by reference to the description of the drawings and to the claims to be hereinafter given.

Figure 1:
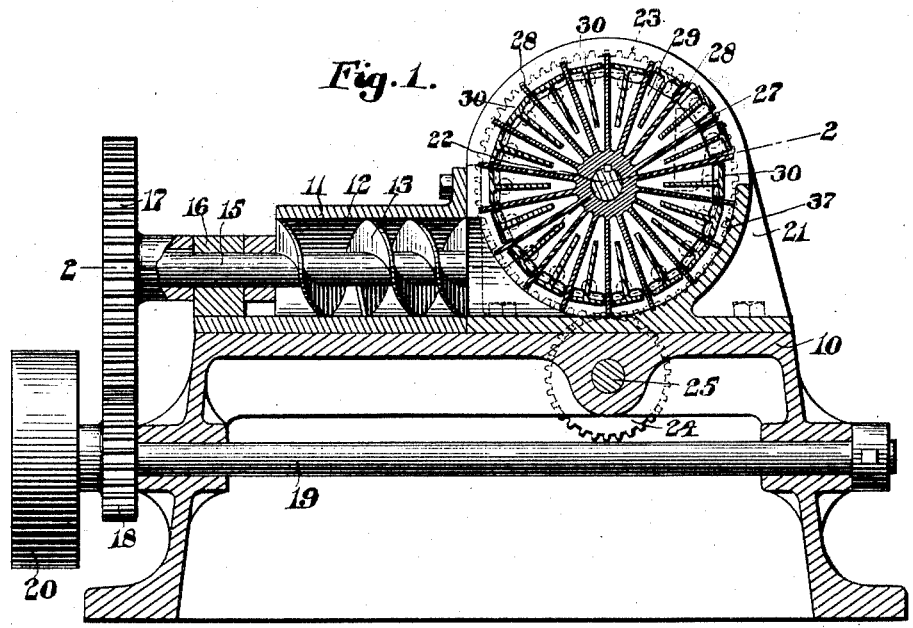
Figure 2:
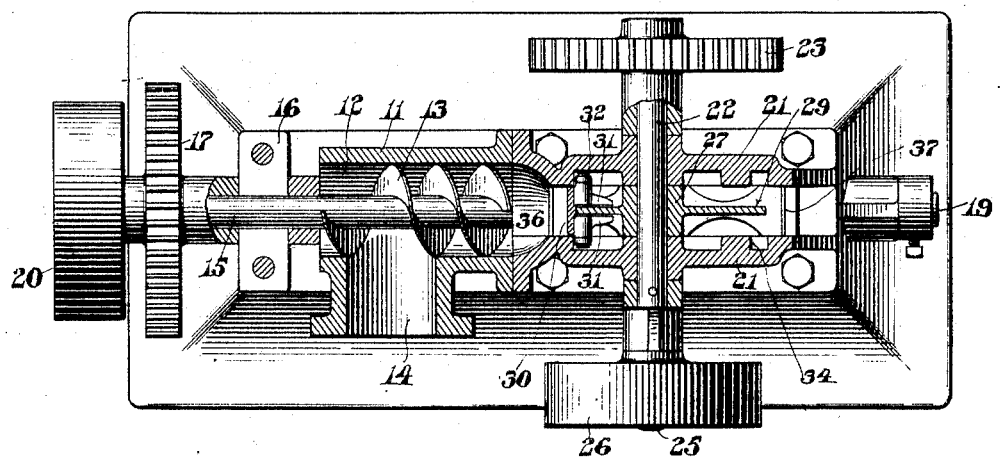
Figure 3:
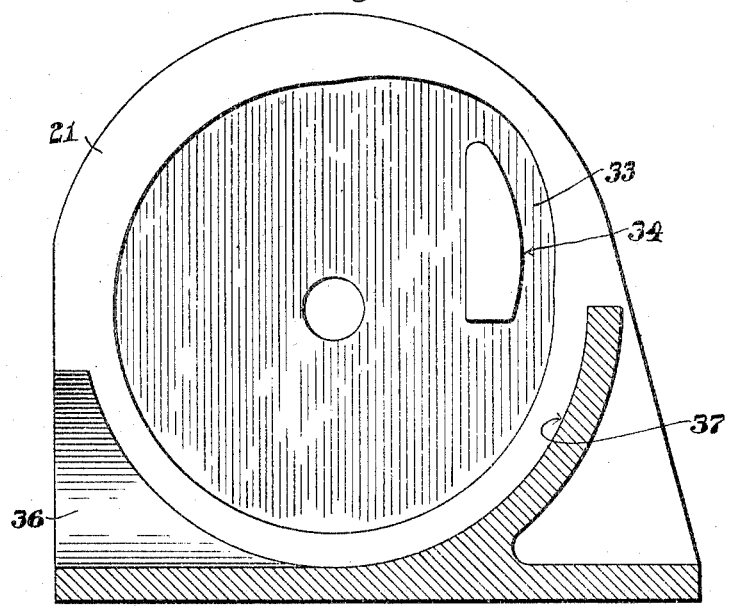
Figure 4:
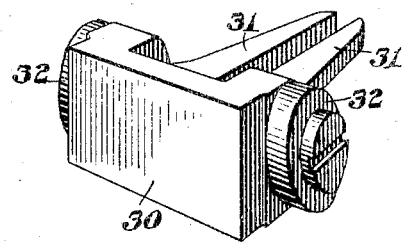

Of the drawings, Figure 1 represents a sectional elevation of a machine embodying this invention. Fig. 2 represents a sectional plan of the same, the cutting-plane being on line 22 on Fig. 1. Fig. 3 is an enlarged sectional elevation of one of the side plates, showing the cam-surfaces; and Fig. 4 is an enlarged perspective view of one of the movable bottoms.

Similar characters indicate like parts throughout the several figures of the drawings.

In the drawings, 10 is the main frame of the machine, having secured thereto the casting 11, in the cylindrical chamber 12 of which is mounted the conveyer-screw 13, to which the material to be used is fed through the inlet 14. The spindle 15 of the conveyer-screw 13 is mounted in a bearing 16 and is provided with a gear 17, meshing with a pinion 18 on the main driving-shaft 19, which is driven by the pulley 20.

To the top of frame 10 are secured two upright plates 21, provided with bearings for the shaft 22, which is provided with a gear 23, meshing with a pinion 24 on the shaft 25, which is driven at any desired speed by the pulley 26.

Between the plates 21 and upon the shaft 22 is securely mounted the wheel 27, provided with radial arms 28 and a central strengthening-rib 29, extending nearly to the end of the arms 28. These arms 28 and the side plates 21 form a plurality of chambers open at their ends and in which are mounted a series of movable bottoms 30, provided with fingers 31, which straddle the central rib 29 for the purpose of directing the movement of said bottoms. Each of the bottoms 30 is provided with rollers 32, which project into a recess in said plates 21 and are acted upon by the cam-surface 33 to control the movement of the bottoms 30, said bottoms being kept at a uniform distance from the shaft 22 until they reach a convenient point, when the rollers 32 are operated upon by the throw 34 to move the bottoms to the extreme ends of the arms 28 to discharge from the chambers the briquets contained thereon.

A contracted chamber 36 is formed in the plates 21, the outer end of which conforms to the shape of the cylindrical chamber 12.

The side plates 21 are provided with a surface 37, which coöperates with the revoluble wheel 27 for the purpose of compressing the material fed into the compartments therein.

The operation of the invention is as follows: The material to be used is fed into the machine through the inlet 14 to the screw conveyer 13, which forces the same through the contracted chamber 36 to the chambers in the wheel 27. The screw conveyer 13 is arranged to deliver a greater quantity of material than the wheel 27 can remove without compression of the same, and as a consequence the material is forced into the chamber under a great pressure and is delivered at a predetermined point in a compact mass of uniform size.

Both the driving-shafts are driven from counter-shafts at such a speed as will produce the best results.

It is believed that from the foregoing the invention will be thoroughly understood without further description here.

Having thus described my invention, I claim—

1. The combination of two stationary side plates and a revoluble hub having bearings therein and provided with a series of radial transverse plates projecting therefrom and coacting with said side plates throughout the greater part of its revolution to form a plurality of compartments, a movable bottom to each compartment coöperating with said side plates and transverse plates to form a plurality of shallow pockets, means for forcing material into said pockets, a bed forming the outer wall of said pockets during compression, and means for ejecting the material from said pockets after compression.

2. The combination of two stationary side plates, a revoluble hub having bearings therein and provided with a series of radial transverse plates projecting therefrom and coacting with said side plates throughout the greater part of its revolution to form a plurality of compartments, a movable bottom to each compartment coöperating with said side plates and transverse plates to form a plurality of shallow pockets, means for forcing material into said pockets, a bed forming the outer wall of said pockets during compression, and cam-paths formed in said side plates for coöperating with said movable bottoms to force the material from said pockets.

3. The combination of two stationary side plates, a revoluble hub, having bearings therein and provided with a series of radial transverse plates projecting therefrom and coacting with said side plates throughout the greater part of its revolution to form a plurality of compartments, a movable bottom to each compartment coöperating with said side plates and transverse plates to form a plurality of shallow pockets, means for forcing the material into said pockets, a bed forming the outer wall of said pockets during compression, a cam-path located in each of said side plates, and rollers mounted upon each of said movable bottoms and engaging with said cam-paths.

4. The combination of a revoluble wheel provided with a series of radial transverse partitions forming a plurality of compartments without side walls extending from the hub of said wheel to its outer periphery, stationary side plates provided with suitable bearings for said wheel and between which it revolves in contact therewith throughout its revolution, a movable bottom to each compartment coöperating with said side plates and said transverse partitions to form a plurality of pockets in the periphery of said revoluble wheel, means for forcing the material into said pockets, and means for ejecting the material from said pockets.

5. The combination of a revoluble wheel provided with a series of radial transverse partitions forming a plurality of compartments without side walls extending from the hub of said wheel to its outer periphery, stationary side plates provided with suitable bearings for said wheel and between which it revolves in contact therewith throughout its revolution, a movable bottom to each compartment coöperating with said side plates and said transverse partitions to form a plurality of pockets in the periphery of said revoluble wheel, means for forcing the material into said pockets, and a cam-path in each of said side plates coöperating with said movable bottoms to force the material from said pockets.

6. The combination of a revoluble wheel provided with a series of radial transverse partitions forming a plurality of compartments without side walls extending from the hub of said wheel to its outer periphery, two stationary side plates provided with suitable bearings for said wheel and between which it revolves in contact therewith throughout its revolution, a movable bottom to each compartment coöperating with said side plates and said transverse partitions to form a plurality of pockets in the periphery of said revoluble wheel, means for forcing the material into said pockets, a cam-path located in each of said side plates, and rollers mounted upon each of said movable bottoms and engaging with said cam-paths.

7. The combination of a revoluble wheel without sides but provided with a plurality of transverse radial partitions and a central rib connecting the same, stationary side plates between which said wheel revolves and coacting therewith to form a plurality of compartments in its periphery, a movable bottom to each compartment, a pair of legs to each bottom straddling said central rib, a bed to coöperate with said wheel, means for forcing material into said compartments, a cam-path located in each of said side walls, and rollers mounted upon each of said movable bottoms to engage with said cam-path.

8. A revoluble wheel comprising a hub, a series of transverse plates radiating therefrom, and a series of movable bottoms interposed between said plates, in combination with a bed-plate, and two independent side plates mounted upon said bed-plate with parallel sides rising at right angles to said bed-plate and provided with suitable bearings for said revoluble wheel, said plates coacting with said transverse radial plates and movable bottoms to form a series of compartments in the periphery of said wheel.

9. A revoluble wheel comprising a hub, a series of transverse plates radiating therefrom, and a series of movable bottoms interposed between said plates, in combination with a bed-plate, two independent side plates mounted upon said bed-plate with parallel sides rising at right angles to said bed-plate and provided with suitable bearings for said revoluble wheel, said plates coacting with said transverse radial plates and movable bottoms to form a series of compartments in the periphery of said wheel, and cam-paths formed in the faces of said plates to operate said movable bottoms.

10. A revoluble wheel comprising a hub, a series of transverse plates radiating therefrom, a central rib connecting said transverse radial plates, and a series of movable bottoms interposed between said plates, in combination with a bed-plate, and two independent side plates mounted upon said bed-plate with parallel sides rising at right angles to said bed-plate and provided with suitable bearings for said revoluble wheel, said plates coacting with said transverse radial plates and movable bottoms to form a series of compartments in the periphery of said wheel.

11. A revoluble wheel comprising a hub, a series of transverse plates radiating therefrom, a central rib connecting said transverse radial plates, and a series of movable bottoms provided with legs straddling said central rib, in combination with a bed-plate, and two independent side plates mounted upon said bed-plate with parallel sides rising at right angles to said bed-plate and provided with suitable bearings for said revoluble wheel, said plates coacting with said transverse radial plates and movable bottoms to form a series of compartments in the periphery of said wheel.

12. A revoluble wheel comprising a hub, a series of transverse plates radiating therefrom, and a series of movable bottoms interposed between said plates, in combination with a bed-plate, one portion of which is tangential to the periphery of said wheel while the remainder conforms to said periphery, and two independent side plates mounted upon said bed-plate with sides parallel to each other rising at right angles to said bed-plate and provided with suitable bearings in said revoluble wheel, said plates coacting with said transverse radial plates and movable bottoms to form a series of compartments in the periphery of said wheel.

Signed by me at Boston, Massachusetts, this 23d day of January, 1903.

CHARLES DUNSFORD JENKINS.

Witnesses:
    WALTER E. LOMBARD,
    EDWIN T. LUCE.